Aug. 4, 1942.  D. R. GROSSMAN  2,292,004
AUTOMOBILE BODY HEATER
Filed June 17, 1937  2 Sheets-Sheet 1
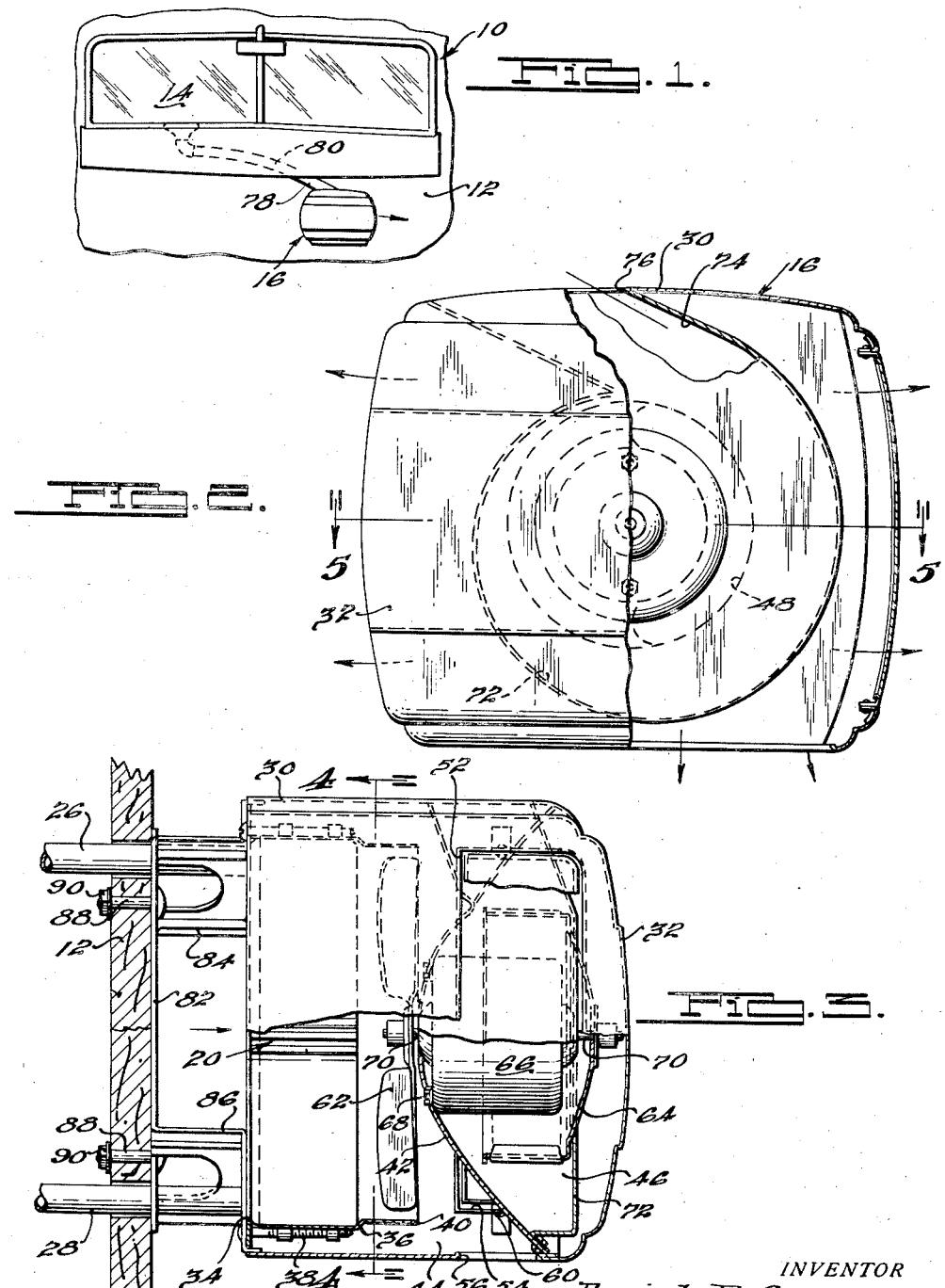
INVENTOR
Daniel R. Grossman.
BY
Harness, Dickey & Pierce.
ATTORNEYS.

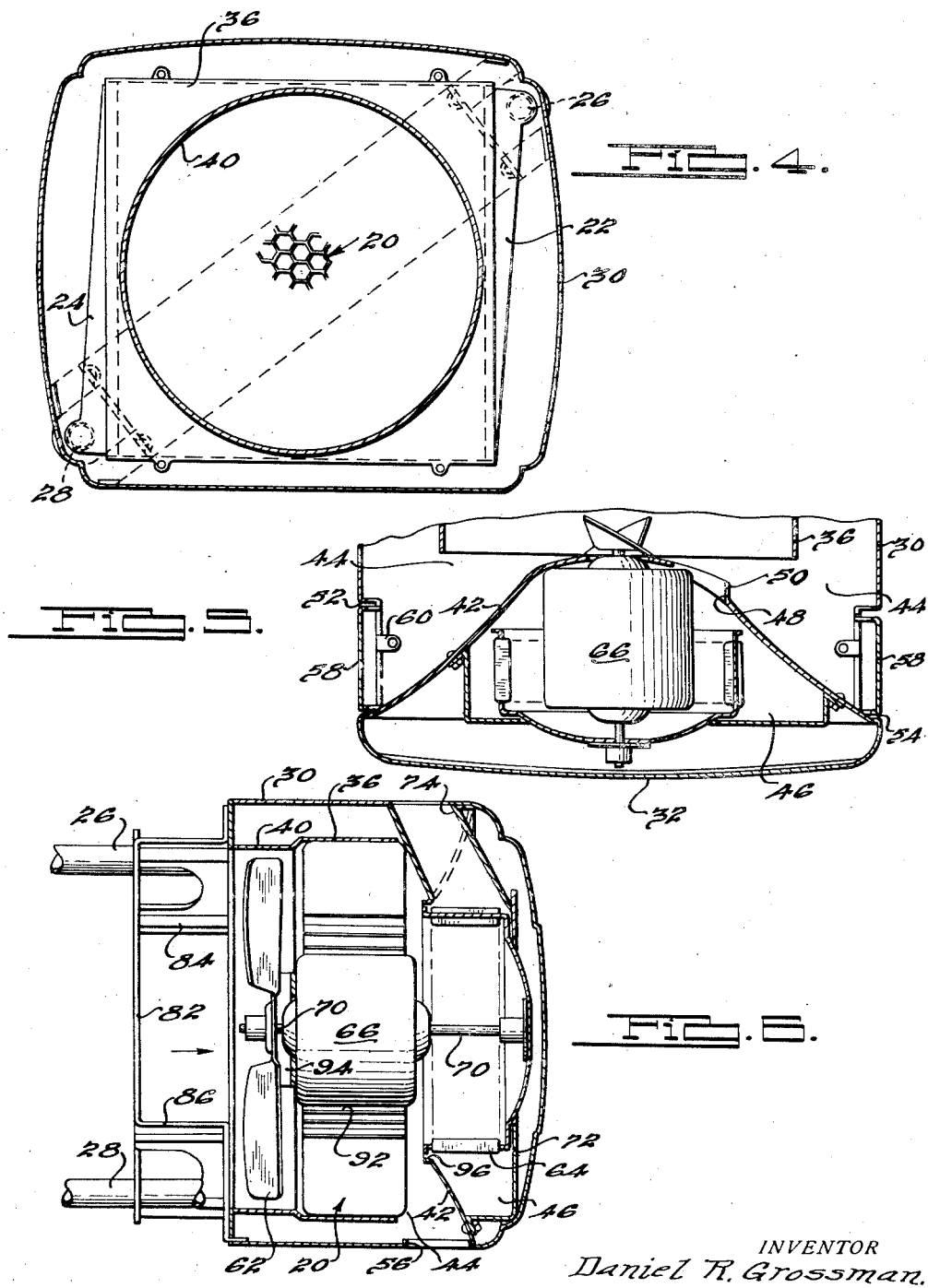

Patented Aug. 4, 1942

2,292,004

UNITED STATES PATENT OFFICE 2,292,004

AUTOMOBILE BODY HEATER

Daniel R. Grossman, Windsor, Ontario, Canada, assignor to Burd Piston Ring Company, Rockford, Ill., a corporation of Illinois Application June 17, 1937, Serial No. 148,676

2 Claims. (Cl. 257—137)

This invention relates to improved heaters and particularly to heaters of the type adapted to be mounted in the passenger compartments of automobiles for heating the interior thereof.

Objects of the present invention are to provide an improved and simplified heater structure by which the heated air may be discharged from the heater in an improved manner both into the passenger compartment and also against the inner face of the windshield for preventing the formation of frost or ice thereon; to provide a compact heater structure by which adequate volumes of heated air may be discharged directly into the passenger compartment and against the inner face of the windshield and which will take up a minimum of room within the passenger compartment; to provide an air deflecting structure of novel construction and arrangement within a heater casing to thereby provide a main air discharge chamber and an auxiliary discharge chamber; to provide a new and improved arrangement of a plurality of fan elements relative to the heating core and to the deflecting baffle; and to provide a heater structure which is economical to manufacture and efficient in use.

Other objects of the invention will become apparent from the following specification, the drawings relating thereto, and from the claims hereinafter set forth.

In the drawings in which like numerals are used to designate like parts in the several views throughout:

Figure 1 is a fragmentary elevational view of the interior of a vehicle having associated therewith a heating unit embodying features of the present invention;

Fig. 2 is an enlarged front elevational view of the heater illustrated in Fig. 1 with parts broken away showing parts in section;

Fig. 3 is a side elevational view of the heater illustrated in Fig. 2 with parts broken away illustrating parts in cross section;

Fig. 4 is a cross sectional view taken substantially along the line 4—4 of Fig. 3;

Fig. 5 is a cross sectional view taken substantially along the line 5—5 of Fig. 2; and Fig. 6 is a vertical cross sectional view similar to Fig. 3, illustrating a modified form of the present invention.

The present invention is directed to an automobile heater of the type which is adapted to be mounted within the passenger compartment of an automobile, and which includes a core which is heated by steam or hot water, and a motor driven fan which circulates air in the body through the core for the purpose of heating the air. Also, the present invention is directed to the type of heater in which a portion of the heated air is directed against the inner face of the automobile windshield independently of a main body of air from the heater which is directed into the passenger compartment. The air directed against the inner face of the windshield removes any condensed moisture in the form of fog, or the like, that tends to collect on the windshield, and also melts any snow or ice on the exterior of the windshield, thus insuring proper vision for the driver.

In the type of heater to which the present invention is directed, the manner in which the heated air is directed into the passenger compartment is important; and according to the present invention the main body of air which is discharged from the heater is discharged toward the sides and toward the floor of the vehicle so that the heated air is properly diffused within the passenger compartment.

According to the present invention a novel type of air deflecting member is provided within a heater housing which cooperates with the deflecting member to provide a main air discharge chamber and an auxiliary discharge chamber. The deflector member is so shaped that the air passed through the heating core and directed against the deflector is properly diffused for discharge from the heater directly into the passenger compartment; and the baffle has an opening therethrough which provides an inlet for the auxiliary air discharge chamber. A fan unit is provided which includes a propeller fan member and a centrifugal fan member in which the centrifugal fan member is mounted within the auxiliary air chamber.

For a better understanding of the invention reference may be had to the accompanying drawings in which an automobile 10 is illustrated having a dashboard 12, a windshield 14, and a heater assembly 16 mounted on a supporting member, preferably the dashboard 12 of the vehicle, within the passenger compartment.

The heater assembly 16 includes a heating core generally indicated at 20 which is preferably substantially rectangular in shape and is of the honeycomb type, in the embodiment illustrated. It is to be understood that the particular type of core per se does not form a feature of the present invention, and that any of the known types of cores may be used in the arrangement and combination described and claimed within the scope of the present invention. For example, rather than using the honeycomb type of core, a tube and fin type could be used, or a circular core in which the air is drawn radially inwardly and then axially of the core could be used. The core 20 illustrated includes header members 22 and 24 which communicate with the honeycomb structure in the usual way.

In order to communicate the headers with the water cooling system of the engine, an upper header tube 26 communicates with the interior of the header 22; and a lower header tube 28 communicates with the interior of the header 24. The header tubes 26 and 28 extend through the dash 12 and are connected to the engine cooling system in the usual way. The heating medium is thus derived from the engine cooling system and passes through the tubular member 26 into the header 22 from which the heating medium circulates through the core structure to the header 24 and is returned through the header tube 28 to the engine cooling system.

The heater assembly 16 also preferably includes a housing member 30 which is preferably substantially rectangular in shape and which has a closed front face 32 and an open rear face 34. The opening in rear face 34 of the housing is defined by inwardly directed flanges around the edges of the housing; and a mounting member 36 is mounted within the housing adjacent the open rear face by means of threaded members 38 or the like, which engage the rear face of the housing and also engage the mounting member 36. The core 20 is mounted within the member 36, and the member 36 is preferably rectangular in shape in that portion within which the core is mounted so that the sides of the member 36 engage the sides of the core and position the core within the heater. The member 36 is shaped inwardly to provide an annular conduit member 40 which assists in confining the discharge of the heated air from the core in a manner that will hereinafter become more apparent.

A flared or dish-shaped air deflecting member 42 is mounted adjacent the outlet side of the core within the housing. The outer marginal edges of the dish-shaped member 42 extend to the sides of the housing, and the marginal edges of the deflector 42 are substantially complementary in shape to the walls of the housing 30. The edges of the member 42 engage the housing adjacent the juncture of the front wall 32 with the side walls of the housing. The member 42 is thus so arranged and positioned within the housing 30 that the housing 30 cooperates with the deflecting member 42 to provide a main air discharge chamber 44 and an auxiliary air discharge chamber 46. An opening 48 is provided through the member 42 and provides an inlet for the auxiliary discharge chamber 46. A flange 50 is preferably provided adjacent the opening 48 for assisting in the direction of air into and through the inlet opening 48.

In order to discharge the heated air directly into the passenger compartment of the vehicle, elongated discharge openings 52 and 54 are provided in the upstanding side walls of the housing, and an elongated opening 56 is provided in the bottom wall of the housing, these openings communicating with the main discharge chamber 44. The openings 52, 54, and 56 are preferably located adjacent the front corners of the housing and adjacent the region at which the marginal edges of the deflector 42 engage the housing so that as the heated air is passed through the heating core, it is directed outwardly by the sweeping walls of the deflector 42 and directed through the discharge openings.

In order to control the direction and volume of air passed through the discharge openings, pivoted doors or shutters 58 are mounted within the openings 52 and 54 for pivotal movement about vertical axes so that by controlling the position of the doors 58, the direction and volume of air passed through the openings 52 and 54 may be suitably controlled. The pivotal mountings for the doors 58 may be pivotally secured relative to similar cooperating lugs fixed to the heater housing. The pivotal mountings are preferably so located that the doors may be pivoted so that the air passed through the openings is directed forwardly of the heater, or rearwardly of the vehicle.

In order to pass the air through the core and discharge the heated air from the heater assembly, a fan unit is provided which includes a propeller fan member 62 and a centrifugal fan member 64. The fan member 62 is mounted within the housing between the deflector 42 and the outlet face of the core 20 with the fan blades mounted within the annular portion 40 of the mounting member 36. The annular member 40 thus provides a confining passage for the air drawn through the core by the fan member 62.

The centrifugal fan member 64 is preferably of the sirocco type and is mounted within the auxiliary air discharge chamber 46 with the inlet of the fan directed toward the inlet opening 48 and with the periphery of the fan extending slightly outwardly therebeyond. A motor 66 is also mounted within the auxiliary air chamber, thus shortening the depth of the heater assembly, and may be secured in position by means of bolts 68 which extend through the deflector member 42 and are secured to the motor housing for holding the motor in position. The fan members 62 and 64 are preferably mounted on the common motor shaft 70 for rotation together.

In order to assist in confining the passage of air within the auxiliary chamber 46 and for assisting in controlling the air discharge from the centrifugal fan member, a housing member 72 is preferably mounted within the auxiliary chamber 46 in surrounding relation to the peripheral portion of the centrifugal fan member. The member 72 is provided with a tubular discharge portion 74 which extends through the deflecting member 42 and also extends through an opening 76 in the top wall of the housing 30. According to the broader aspects of the present invention, the member 72 is not necessary to the operation of the heater, but best results are obtained by using the member 72 and its use is therefore preferred.

In order to conduct the heated air within the auxiliary chamber 46 to a position adjacent the inner face of the windshield along the lower edge thereof, a tubular fitting member 78 is provided which is adapted to cooperate with the tubular conduit portion 74. The fitting member has associated therewith an elongated tubular conduit member 80 which extends preferably behind the instrument panel of the automobile to a position adjacent the inner surface of the windshield 14 along the lower edge thereof. An opening or slot may be provided through the instrument panel adjacent the conduit 80 for directing the air from the conduit upwardly against the inner face of the windshield.

In order to mount the heater assembly to the vehicle within the passenger compartment, a U-shaped bracket or strap member 82 having bent end portions 84 and 86 is positioned preferably diagonally across the rear open face of the heater housing. The end portions 84 and 86 may be suitably secured to the heater housing; and the bracket may be fixedly secured to the dash 12 by means of the bolts 88 and nuts 90, or the like. The open rear face 34 of the heater casing is thus positioned in spaced relation from the dash board 12 so that the entering air has free access to the inlet side of the core 20 for passage therethrough.

In the operation of the structure so far described, upon rotation of the fan members 62 and 64, air from within the passenger compartment is drawn into the heater assembly through the rear open face 34 and is caused to pass through the heating core and be heated thereby. The heated air is directed against the dish-shaped deflector 42, into the main discharge chamber 44, and a portion of the air is caused to pass through the opening 48 into the auxiliary air discharge chamber 46. The heated air is discharged from the discharge chamber 44 directly into the passenger compartment through the openings 52, 54, and 56, and by the arrangement of these openings, the air is directed sidewardly and downwardly of the heater for diffusion within the passenger compartment. The heated air within the auxiliary chamber 46 is discharged through the conduit 80 to a position against the rear face of the windshield for preventing the formation of frost or ice thereon.

It is pointed out that according to the broader aspects of the present invention, the fan member 62 is sufficient for discharging air directly into the passenger compartment and also through the opening 48 into the auxiliary chamber 46 and from thence against the windshield; but in order to obtain best results, it is preferable to use the centrifugal fan member 64 for insuring the discharge of an adequate volume of heated air against the windshield.

In the modified structure illustrated in Fig. 6, the mounting member 36 is reversed in its position within the heater so that the core 20 is positioned toward the longitudinal center of the housing 30. An opening 92 is provided through the core 20 substantially at its center and provides a space within which the motor 66 is mounted. For positioning the motor 66 within the core, a transversely extending bracket member 94 may be provided, the bracket member 94 having flanged ends which are suitably secured to the sides of the mounting member 36. The housing of the motor 66 may be suitably secured to the bracket 94.

The fan member 62 is mounted on the motor shaft 70 adjacent the inlet face of the core 20, and the centrifugal fan member 64 is mounted on the motor shaft 70 within the auxiliary chamber 46.

In the modification illustrated in Fig. 6, the flared or dish-shaped baffle member 42 is materially shortened in length by providing a centrally aligned opening 96 transversely of the deflector 42 which provides an inlet opening for the auxiliary chamber 46. The opening 96 is of slightly greater size than the centrifugal fan 64 and the centrifugal fan is mounted within the inlet face of the fan within the opening 96. The heater illustrated in Fig. 6 by the arrangement illustrated is materially shortened as compared with the heater shown and described relative to Figs. 2 to 5.

In the operation of the structure shown in Fig. 6, the fan 62 forces the air through the heating core against the walls of the deflector 42. The centrifugal fan 64 draws the air inwardly into the center of the fan and discharges the air outwardly into the air chamber 46. The deflector 42 directs a portion of the heated air outwardly from the heater through the openings 52, 54, and 56 in the housing 30; and the fan 64 discharges the heated air from the auxiliary chamber 46 through the conduit 74 and through the elongated conduit 80 to a position for discharge against the inner face of the windshield.

Formal changes may be made in the specific embodiments of the invention described without departing from the spirit and substance of the invention, the scope of which is commensurate with the appended claims.

What is claimed is:

1. In a vehicle having a windshield, a heater structure mounted within said vehicle comprising a heating core, a dish-shaped air deflector mounted adjacent one side of the core, a housing member mounted in surrounding relation to said deflector and cooperating with said deflector to form a main air discharge chamber and an auxiliary discharge chamber, the peripheral edges of the dish-shaped air deflector extending substantially to the sides of the housing, an opening in said deflector providing an inlet for said auxiliary chamber, an air discharge opening in said housing communicating with the main air discharge chamber, a discharge conduit communicating with said auxiliary chamber, a fan unit mounted so as to pass air through said core against said deflector, through said deflector opening into said auxiliary chamber, and discharge said air from said discharge chambers through said discharge opening and through said discharge conduit, said fan unit including a propeller fan member mounted adjacent the inlet side of said core forcing air therethrough, and a centrifugal fan member mounted within said auxiliary chamber adjacent the other face of said core, and a motor mounted within said core operatively connected to said fan members.

2. In a vehicle having a windshield, a heater structure mounted within said vehicle comprising a substantially rectangular heating core provided with a space through the center thereof, a dish-shaped air deflector mounted adjacent one face of the core with the axis of the deflector substantially aligned with the axis of the core, a housing member mounted in surrounding relation to said deflector and cooperating with said deflector to form a main air discharge chamber and an auxiliary discharge chamber, the peripheral edges of the dish-shaped air deflector extending substantially to the sides of the housing, an opening in said deflector at the center thereof providing an inlet for said auxiliary chamber, air discharge openings in said housing communicating with the main air discharge chamber, a discharge conduit communicating with said auxiliary chamber, a fan unit mounted so as to pass air through said core against said deflector, through said deflector opening into said auxiliary chamber, and discharge said air from said discharge chambers through said discharge openings and through said discharge conduit, said fan unit including a propeller fan member mounted adjacent the inlet side of said core, and a centrifugal fan member mounted adjacent the discharge side of said core within said auxiliary chamber with the inlet of said centrifugal fan aligned with the deflector opening, and a motor mounted within the space in said core operatively connected to said fan members.

DANIEL R. GROSSMAN.